April 6, 1948.                    E. G. PARVIN                    2,439,184
                              MAGNETIC FLAW DETECTOR
                              Filed Jan. 23, 1943
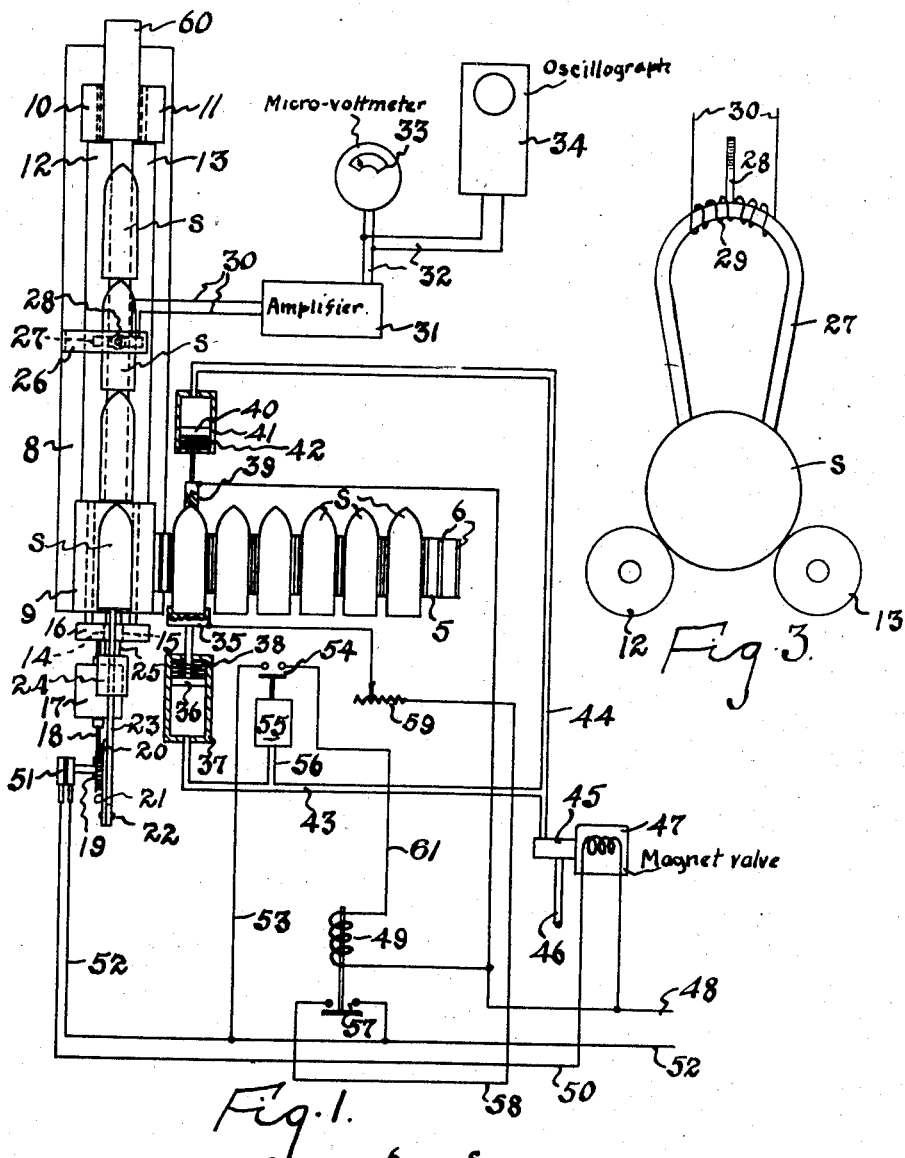
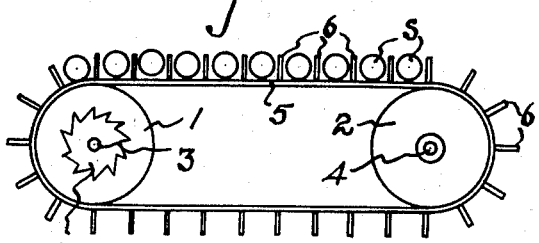
INVENTOR.
Edward G. Parvin.
BY Darby & Darby.
Atty's.

Patented Apr. 6, 1948

2,439,184

UNITED STATES PATENT OFFICE 2,439,184

MAGNETIC FLAW DETECTOR

Edward G. Parvin, Roselle, N. J., assignor to National Pneumatic Company, New York, N. Y., a corporation of West Virginia Application January 23, 1943, Serial No. 473,285

3 Claims. (Cl. 175—183)

This invention is concerned with improvements in mechanisms and methods by means of which flaws and defects in magnetizable metal objects may be rapidly and accurately detected.

The basic object of this invention is to provide a mechanism which is substantially automatic for testing objects of this kind, as, for example, shells, to determine whether in the bodies thereof there are any flaws or defects which would render them unsuitable for their normal use.

Other and more detailed objects of the invention will be apparent from the following description of the construction and operation of one embodiment thereof.

This invention resides substantially in the combination, construction, arrangement, relative location of parts, steps and series of steps, as will be described in detail below.

In the accompanying drawings,

Figure 1 is a diagrammatic and schematic top plan view of one form of mechanism embodying the subject matter of this invention, with some parts in cross-section;

Figure 2 is a side elevational view of a portion of the mechanism showing the conveyor; and Figure 3 is a diagrammatic end view of the detail of the mechanism.

The following description will be related to a machine and to a method for testing shells, as, for example, the steel body portion of a shell for an anti-aircraft or anti-tank gun. All types of war goods, and shell bodies are no exception, are subject to rigid tests which they must pass before they are acceptable. The steel shells must not contain any defects or flaws in the body thereof. The result is that under present methods of testing many good shells are discarded because of the presence of surface flaws which may or may not indicate cracks or flaws in the body thereof, and which as a result makes it necessary to discard them. On the other hand, it frequently happens that shells contain internal cracks and flaws which do not extend to the surface, with the result that they are accepted, whereas they should be rejected. It is a general object of this invention, therefore, to provide an easily readable indicating and testing mechanism which will not discard shells that are perfect even though they contain surface scratches, and on the other hand, will discard imperfect shells whether the flaws are visible from the surface or not.

In accordance with present practice shells are subjected to a number of tests including a minute microscopic inspection of the surface thereof by means of magnifying lenses and the like. Obviously this form of inspection is uncertain, tedious and time consuming. In accordance with this invention routine inspections of this type may be eliminated, and in place thereof foolproof, rapid and simple testing is accomplished by a machine which is substantially automatic.

As illustrated in the drawings, a conveyor for the shells or the like is provided; upon the conveyor, the shells may be placed individually by hand, or may be fed by any suitable form of feeding mechanism, not shown. This conveyor is illustrated as of the endless belt or chain type, comprising a pair of rollers, pulleys, sprocket wheels or the like 1 and 2 journaled, by means of the shafts 3 and 4, respectively, on bearings, not shown for the sake of simplicity. Secured to the shaft 3 for rotation with the pulley 1, is a ratchet wheel 7 which will be referred to later. Extending between the wheels 1 and 2 is a belt or carrier 5 of any suitable construction, upon which is mounted at regular intervals a series of facings or partitions providing pockets to receive the shells individually, as clearly illustrated in the drawings. As those skilled in the art will readily appreciate, the belt or carrier 5 can be of any suitable warping material, or may be of the link or chain type, as best suits the particular adaptation of the invention.

As illustrated in Figure 1, this conveyor is positioned at right angles to a table or support 8, so that the shells are delivered from the conveyor onto a platform 9 at one end of the table. A pair of continuous rollers 12 and 13 are journaled at one end of the platform 9, and at their opposite ends in the spaced bearing members 10 and 11. The rollers 12 and 13 are spaced as shown so that the shells S can ride in the bight therebetween and be caused to revolve therewith. The bearing portions of the rollers 12 and 13 extend through the platform 9, as shown, and each is provided with a pulley 14 and 15, respectively, which are engaged by a belt 16, which in turn engages a pulley on the projecting shaft of motor 17. The single drive pulley of the motor will cause the rollers 12 and 13 to revolve in the same direction so that the shells S mounted thereon will be caused to revolve more or less on their axes, depending upon their uniformity with respect thereto. The other end 18 of the shaft of motor 17 is provided with a worm 19 which engages a wormwheel 20 on a shaft, as shown, which in the actual machine, of course, will be mounted in suitable bearings.

The wormwheel 20 is connected by a crank to the lever 21, or is provided with a suitable cam slot and pin or any other equivalent structure, to cause the upper end of the lever 21 (its lower end being pivotally mounted) to rotate, so that, by reason of its pivotal connection at 22 to the rod 23, the rod 23 will be caused to reciprocate axially at the desired rate. The rod 23 is slidably mounted in a bearing member 24 mounted on the bracket 25, which is supported within the table 8. Thus the motor 17, in addition to causing rotation of the rollers 12 and 13, will cause the pusher rod 23 to push the shells axially from the platform 9 onto rollers 12 and 13. Thus each shell, as deposited on the platform 9 from the conveyor, is pushed ahead at the proper time, causing the preceding shells to be pushed along the rollers 12 and 13 until they are discharged, one at a time, by the chute 60.

Mounted on the table 8 is a bracket 26 which is arranged to overhang the path of the shells and from which is supported a horseshoe shaped magnetizable iron or steel member 27. This member is provided with a threaded stud 28 by means of which it may be suspended in the bracket 26. A spring, not shown, is interposed between the member 27 and the bracket 26 so that the member 27 may have vertical movement, as will be described later. The threaded end of the stud 28 will be provided with a nut so as to limit its downward movement while leaving it free for vertical movement. A magnetizing coil 29 is wound upon the magnetizable member 27, and is connected, by means of the leads 30, to the input of a suitable amplifier 31, preferably of the vacuum tube type. The output terminals of the amplifier are connected to one or more suitable forms of indicating devices, as, for example, the micro-volt meter 33, or to the cathode ray oscillograph 34 by means of the leads 32. It is to be understood that either the micro-volt meter or the oscillograph may be used alone, or they may be used together, if desired.

The carrier which delivers the shells to the platform 9 is given an intermittent motion by means of a pawl, not shown, cooperating with the ratchet wheel 7. The pawl may be caused to be operated in the proper timed relation by means of the motor 17, or by means of a suitable power source. The ratchet wheel arrangement is merely illustrative since any suitable form of intermittently acting mechanism may be employed to drive the carrier. Positioned adjacent the carrier on one side thereof, is an electrode 35 which is connected to a piston 36 in a cylinder 37. The spring 38 is provided to return the piston 36 and withdraw the electrode 35 when the cylinder 37 is exhausted. In a similar way, an electrode 39 is provided to engage the nose of the shell and is connected to a piston 40 mounted in a cylinder 41. A spring 42 is provided to retract the piston and the connected electrode. The cylinders 37 and 41 are connected by pipes 43 and 44 to a pressure fluid supply valve 45 to which is also connected the pressure fluid pipe 46 extending to any suitable source of pressure fluid, not shown. The valve 45 is part of a magnet valve 47 having an operating winding connected at one terminal to the current supply lead 48. A relay is provided having an operating winding 49, one terminal of which is also connected to lead 48 as is the electrode 39. The other terminal of the winding of magnet valve 47 is connected by wire 50 to one of the contacts of a commutator 51 mounted on the shaft which drives the wormwheel 20. The other contact of this commutator is connected by wire 52 to the other side of the current source. Wire 52 is connected by wire 53 to one of the fixed contacts of an air switch 54. The operating cylinder 55 of the air switch is connected, by means of a pipe 56, to the pipe 43. The interior of the cylinder 55 is not shown in cross section since it is just like the other cylinders, and it contains a piston connected to the movable contact of switch 54, and a spring for retracting the piston so that switch 54 is open. The other contact of switch 54 is connected by wire 61 to the other terminal of the winding 49. The switch 57 of this relay has one fixed contact connected to wire 52, and the other, connected by wire 58 to the electrode 35 through an adjustable resistor 59.

A description of the operation of this apparatus and the method forming part of this invention will now be set forth. Shells S or other magnetizable metal parts are placed upon the carrier individually between the partition 6. The carrier moves step-by-step, to the left on its top flight, so that each shell is stationary for a predetermined period of time in line with the electrodes 35 and 39. Motor 17 is in operation so that the push rod 23 is reciprocating longitudinally in proper timed relation. Commutator 51 is likewise revolving and its contacts are arranged and proportioned so that as the shell comes into alignment with the electrodes 35 and 39, and comes to rest, a circuit is completed from wire 52 through the commutator 51, wire 50, winding of magnet valve 47 and back to wire 48. The valve 45 is operated to connect pipe 46 to the common lead of pipes 43 and 44 so that pressure fluid is supplied to the cylinders 37, 40 and 55. Pistons 36 and 40 move towards the aligned shell so that it is gripped between the electrodes 35 and 39. At the same time, of course, springs 38 and 42 are compressed. In the meantime pressure is building up in the cylinder 55, in which the spring may be so proportioned that switch 54 will not close until the electrodes 35 and 39 are in firm contact with the shell. This object may be further accomplished by means of a properly adjusted orifice valve or the like in the pipe 56, as is well known in the art. As soon as switch 54 is closed a circuit is completed through wire 52, through wire 53, switch 54, and winding 49, and through wire 48, with the result that switch 57 closes, completing a circuit from wire 52 through switch 57, wire 58, adjustable resistor 59, electrode 35, shell S engaged thereby, electrode 39, and back to wire 48. Thus a current is passed directly through the body of the shell S engaged by the electrodes, setting up therein a circular field of magnetization which may be set up in sufficient strength in just a few seconds of time. The strength of the current flowing thereto may be adjusted by means of the resistor 59. Upon the completion of this operation, commutator 51 will have moved so as to break the circuit therethrough. As a result the winding of magnet valve 47 is de-energized, and valve 45 operated to disconnect pipe 46 from the pipes 43 and 44, and to connect them to exhaust into the atmosphere. The spring of cylinder 55 opens switch 54, breaking the circuit to winding 49 so that switch 57 opens, breaking the circuit through the shell. Springs 38 and 42 return pistons 36 and 40, withdrawing the electrodes from engagement with the shell.

As those skilled in the compressed fluid art will appreciate, the operation of this part of the mechanism can be timed so that switch 54 opens before the electrodes 35 and 39 disengage the shell so that no sparking will occur at the electrodes.

An important feature of the invention will now be apparent, namely, that the magnetizing current through the shell is applied for but a few seconds, so that the shell is not heated anywhere near the point where it might be damaged. This is important since shells and other objects frequently requiring such tests are often finely tempered, and undue heating is therefore not desirable. The movement of the carrier is timed so that, as soon as the electrodes 35 and 39 disengage the shell, it advances one step to deliver the magnetized shell onto the platform 9. At this time the push rod 23 is withdrawn, but since the shell is on the platform, the drive for the push rod is so synchronized that it moves forward to push the shell from the platform onto the rollers 12 and 13. In the meantime, another shell on the carrier is being aligned with the electrodes. The pushing of a shell onto the rollers 12 and 13 pushes the preceding shells forward so that one of them is passing under the magnetizable member 27. It will be recalled that the shell is revolving through the rotation of the rollers 12 and 13 so that as it advances, it rotates, with the result that the magnetizable member 27 explores the entire surface thereof. This member, as is indicated in Figure 3, directly contacts the shell. The shell, having a curved contour at the forward end, usually slides under the member 27 and pushes it up against the spring, not shown, surrounding stud 28 so that the magnetizable member 27 engages the shell under the pressure of this spring. Regardless of the concentricity of the surface of the shell with respect to its longitudinal axis, the magnetizable member 27 continually engages the shell and may move up and down if there is any irregularity in its construction such as would result from it being out of round. This is an important feature of the invention because, by reason of it, no false readings result, as would be the case if an air gap existed between the magnetizable member 27 and the shell. Any disturbance of the magnetic field within the shell, caused by the presence of cracks or other flaws, will disturb the uniformity of the field in the magnetizable member 27; and then change of flux will introduce a current in the coil 29 which is different and more pronounced than the average current introduced therein by the normal balanced field in the shell. In other words, in normal operation either the needle of the volt-meter 33, or the graph appearing on the screen of the cathode ray oscillograph will take a flash position, or give a flash indication, which is characteristic of a good shell or a good portion of the shell, which position or condition will be drastically changed if a defect is present, thereby giving an immediate visible indication of the presence of the defect. Surface scratches, for example, will not cause any substantial disturbance of magnetization of the shell, with the result that they will not give an indication to cause rejection of the shell.

In the actual operation of this device, it has been found that flaws within the shell body which were in no way apparent at its surface caused a violent movement of the hand of a micro-volt meter, or caused a sharp peaking of the wave form on the oscillograph, to provide a certain indication of its presence. With this device, as previously mentioned, out of round or similar irregularities of the shell do not give any indication on the meter or the oscillograph as would be the case in some prior art devices where air gaps and the like are present between the pick-up device and the object being tested.

It is, of course, apparent from the above description that the sequence of operation described will continue and that shells may be rapidly and accurately tested under conditions which are not obvious. As those skilled in the electrical arts will appreciate, it would be possible to connect the cathode ray oscillograph 34 directly to leads 30, eliminating the necessity of the amplifier 31. However, the device would be variable with the amplifier, and so the form of connection illustrated is operative. Likewise, those skilled in the art will appreciate that many other variations may be employed, as, for example, the air switch could be eliminated, and the switch 54 formed as part of the commutator 51, if desired. I do not, therefore, desire to be strictly limited to the disclosure as given for the purpose of illustration, but rather by the scope of the claims granted me.

What is claimed is:

1. Apparatus for testing for flaws substantially cylindrical metallic pieces capable of retaining a degree of magnetization after being magnetized, including a plurality of bars for providing a carrier for the pieces, means to compel the pieces to rotate on the bars, means for imparting longitudinal movement to the pieces as they rotate, a magnetizable member forming part of a detecting circuit, and means for supporting the member to effect positive engagement between the member and a piece as the pieces rotate and move past the member.

2. Apparatus for testing for flaws substantially cylindrical metallic pieces capable of retaining a degree of magnetization after being magnetized, including a plurality of bars for providing a carrier for the pieces, means for rotating the bars in the same direction, means for moving the pieces longitudinally along the bars as they rotate, a magnetizable member forming part of a detecting circuit, and means for supporting the member to effect positive engagement between the member and a piece as the pieces rotate and move past the member.

3. Apparatus for testing for flaws substantially cylindrical metallic pieces capable of retaining a degree of magnetization after being magnetized, including a plurality of bars for providing a carrier for the pieces, means for feeding the pieces to the bars, means for rotating the bars in the same direction, means for moving the pieces longitudinally along the bars as they rotate, means controlled by the moving means to cause a current to flow longitudinally of a piece on the feeding means immediately before the delivery of the piece to bars, a magnetizable member forming part of a detecting circuit, and means for supporting the member to effect positive engagement between the member and a piece as the pieces rotate and move past the member.

EDWARD G. PARVIN.

REFERENCES CITED

The following references are of record in the file of this patent:

UNITED STATES PATENTS

| Number | Name | Date |
|---|---|---|
| 939,109 | Switzer | Nov. 2, 1909 |
| 1,628,767 | Brown | May 17, 1927 |
| 1,807,411 | Imes | May 26, 1931 |
| 1,893,074 | Drake | Jan. 3, 1933 |
| 1,960,898 | De Forest | May 29, 1934 |
| 2,043,763 | Meyer et al. | June 9, 1936 |
| 2,193,942 | Shackelford | Mar. 19, 1940 |
| 2,221,570 | Brace et al. | Nov. 12, 1940 |
| 2,308,159 | Drummond et al. | Jan. 12, 1943 |
| 2,317,718 | Barnes et al. | Apr. 27, 1943 |
| 2,351,595 | Bindschedler et al. | June 20, 1944 |

FOREIGN PATENTS

| Number | Country | Date |
|---|---|---|
| 447,864 | Germany | July 28, 1927 |

Certificate of Correction

Patent No. 2,439,184.

April 6, 1948.

EDWARD G. PARVIN

It is hereby certified that errors appear in the printed specification of the above numbered patent requiring correction as follows: Column 1, line 2, strike out the words "and methods"; column 4, line 12, for "partition" read *partitions*; and that the said Letters Patent should be read with these corrections therein that the same may conform to the record of the case in the Patent Office.

Signed and sealed this 19th day of October, A. D. 1948.

[SEAL]

THOMAS F. MURPHY,
*Assistant Commissioner of Patents.*